United States Patent [19]
Garner et al.

[11] Patent Number: 6,039,570
[45] Date of Patent: Mar. 21, 2000

[54] AERATION-CAVITATION DEMONSTRATION CONSOLE

[75] Inventors: Frank Garner, Lake Orion; Joseph Klamecki, Attica, both of Mich.

[73] Assignee: Aeroquip Vickers, Inc., Maumee, Ohio

[21] Appl. No.: 09/004,695

[22] Filed: Jan. 8, 1998

[51] Int. Cl.⁷ ................................................. G09B 9/00
[52] U.S. Cl. ........................................ 434/126; 434/366
[58] Field of Search ................................ 434/219, 126, 434/365, 298, 300, 283, 370, 366, 381; 73/168; 137/217, 254, 888; 417/20

[56] References Cited

U.S. PATENT DOCUMENTS

| | | | |
|---|---|---|---|
| 979,716 | 12/1910 | Squires | 434/126 |
| 3,250,022 | 5/1966 | Midgley | 434/300 |
| 3,535,798 | 10/1970 | Turman | 434/381 |
| 4,084,432 | 4/1978 | Lecoffre . | |
| 5,009,067 | 4/1991 | Bonnell | 434/365 |
| 5,354,203 | 10/1994 | Kotch et al. | 434/126 |
| 5,484,293 | 1/1996 | Ford et al. | 434/219 |

FOREIGN PATENT DOCUMENTS

| | | |
|---|---|---|
| 0391397 | 10/1990 | European Pat. Off. . |
| 3242563 A1 | 5/1984 | Germany . |
| 3337149 A1 | 4/1985 | Germany . |
| 4344609 A1 | 6/1995 | Germany . |

*Primary Examiner*—Valencia Martin-Wallace
*Assistant Examiner*—John Paradiso
*Attorney, Agent, or Firm*—Jones, Day, Reavis & Pogue

[57] ABSTRACT

A hydraulic demonstration apparatus is disclosed having a hydraulic system including a reservoir, an inlet line and an outlet line. A valve at the inlet line is included for introducing air so as to create aeration in the hydraulic system. A restricting valve is provided at the inlet line for creating cavitation in the hydraulic system. A hydraulic pump is provided having a clear cover for observing the effects of aeration and cavitation inside the pump. A flow meter having a clear housing is provided for observing the air in the system and the reduction of pump efficiency caused by aeration. The demonstration apparatus can be mounted on a movable cart.

9 Claims, 3 Drawing Sheets

AERATION-CAVITATION DEMONSTRATION CONSOLE

BACKGROUND OF THE INVENTION

The present invention pertains to the field of educational demonstration devices, particularly those of the type for demonstrating hydraulic systems and the system variables that degrade performance. Aeration is a problem encountered in a hydraulic system when air is introduced into the system. Aeration significantly degrades efficiency by reducing delivery pressure, due to the compressibility of air. Cavitation is a similar problem created when a vacuum arises upstream of the hydraulic pump, producing bubbles from the evaporation of hydraulic fluid.

Aeration can be created from improper fluid seals in the system, from bubbles in the fluid reservoir created by agitation from the return lines, and improperly designed systems. It is essential to efficient hydraulic performance that these problems be avoided. It is thus very important that hydraulic technicians and maintenance personnel receive as part of their training, effective first-hand observation of the effects of aeration and cavitation upon hydraulic pumps and systems.

BRIEF DESCRIPTION OF THE INVENTION

In view of the above, there is therefore a need for a hydraulic demonstration console that permits direct observation of the effects of aeration and cavitation on hydraulic system performance.

There is also a need for a hydraulic demonstration console that includes valves for manually adjusting the rates of aeration and cavitation.

There is also a need for a hydraulic demonstration console that can simulate actual load conditions.

There is also a need for a hydraulic demonstration console that includes gauges for measuring pressure losses resulting from aeration and cavitation.

There is also a need for a hydraulic demonstration console that permits direct observation of the causes and solutions of aeration and cavitation.

The needs of others are satisfied by the hydraulic demonstration apparatus of the present invention in which a hydraulic system is provided including a reservoir, an inlet line and an outlet line. An air valve is provided at the inlet line for introducing air so as to create aeration in the hydraulic system. A restricting valve is also provided at the inlet line for creating cavitation in the hydraulic system. A hydraulic pump is provided having a clear cover for observing the effects of aeration and cavitation inside the pump. A flow meter, having a clear housing, is provided for observing the air in the system and the reduction of pump efficiency caused by aeration.

As will be appreciated, the invention is capable of other and different embodiments, and its several details are capable of modification in various respects, all without departing from the invention. Accordingly, the drawings and description are to be regarded as illustrative in nature and not restrictive.

BRIEF DESCRIPTION OF THE DRAWINGS

The embodiments of the invention will now be described by way of example only, with reference to the accompanying figures wherein the members bear like reference numerals and wherein.

DETAILED DESCRIPTION OF THE INVENTION

Figure 1:
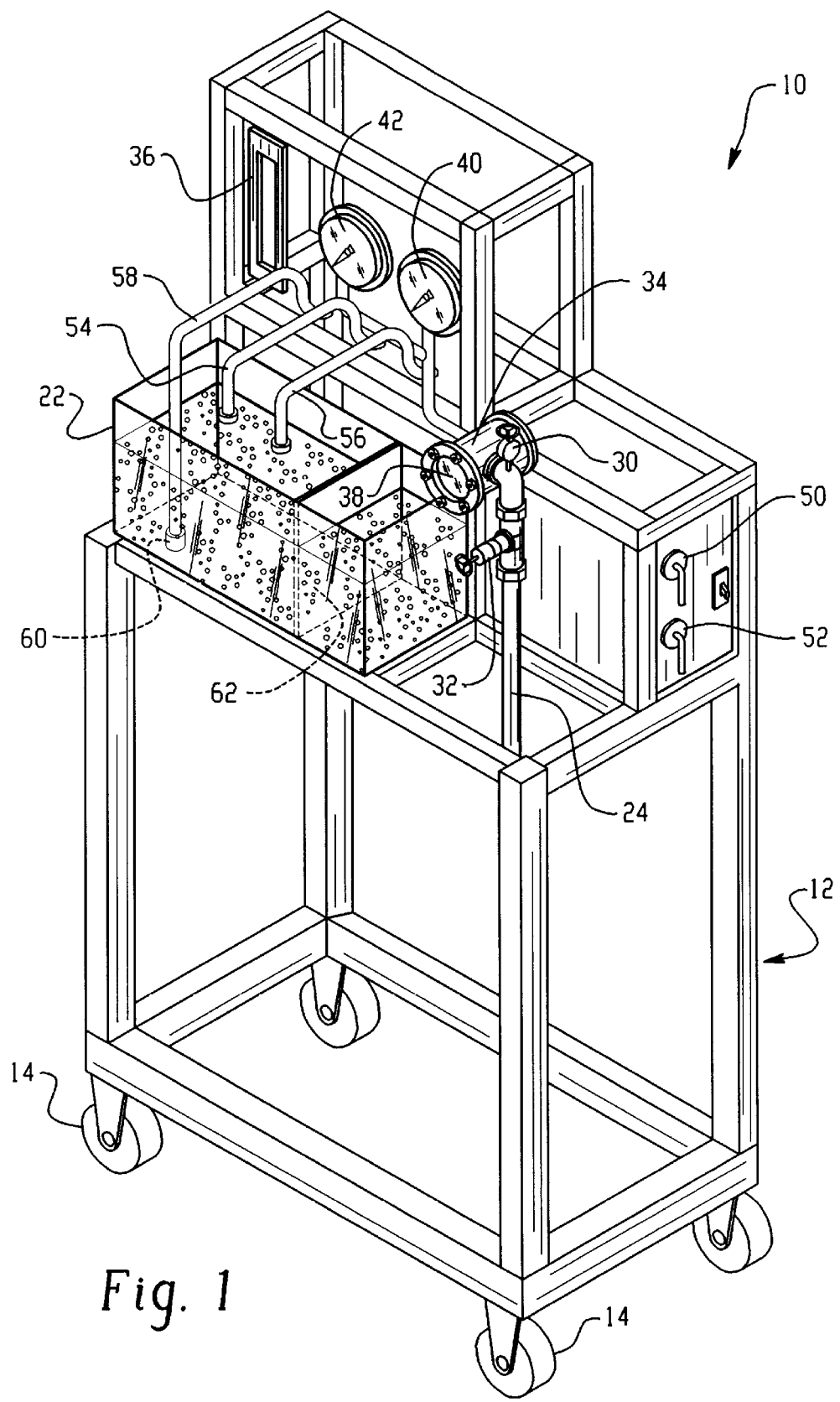
FIG. 1 is an oblique view showing the general configuration of the present demonstration console as according to the preferred embodiment.
Figure 2:
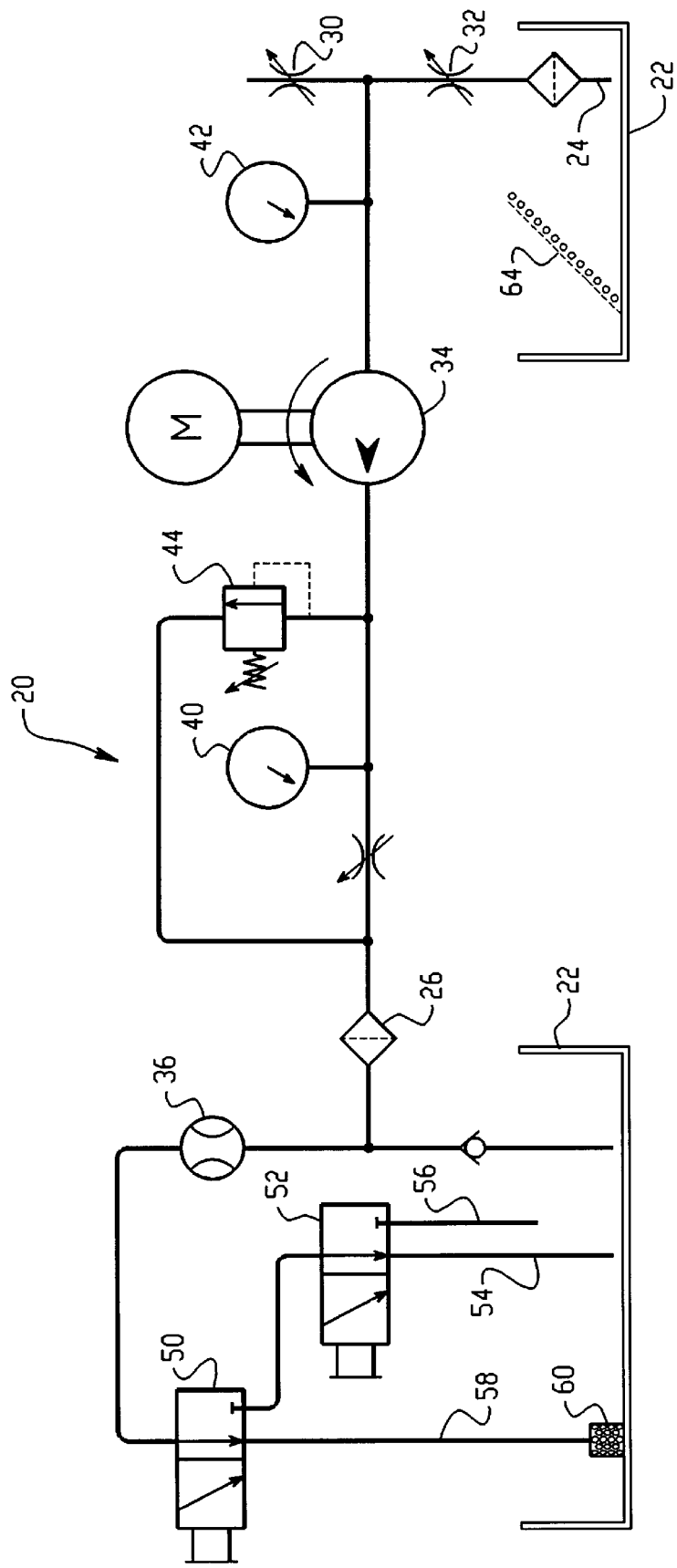
FIG. 2 is a schematic view showing the hydraulic configuration of the preferred embodiment of the present invention.
Figure 3:
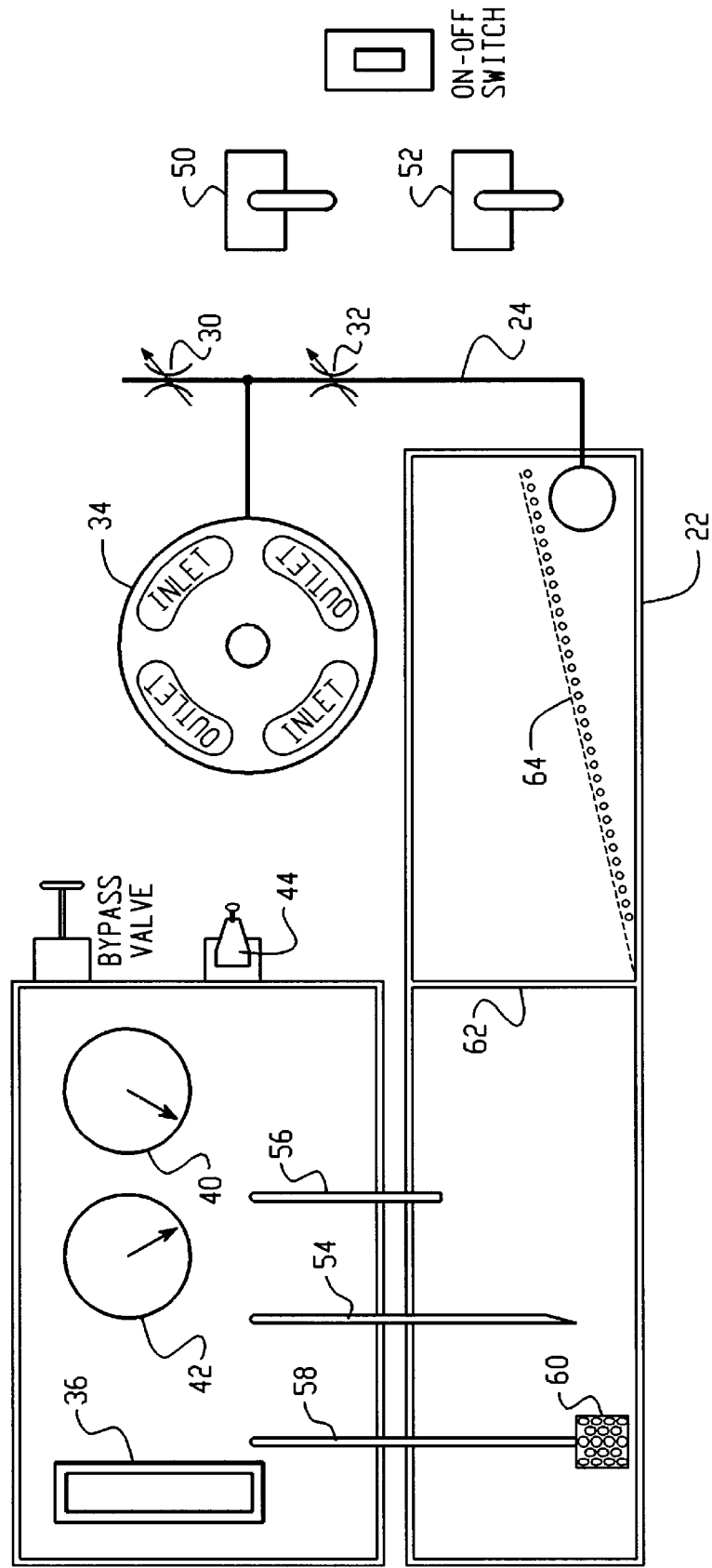
FIG. 3 is a diagram showing the component layout of the preferred embodiment of the present invention.

The drawings illustrate the hydraulic demonstration console 10 as according to the preferred embodiment of the invention. The console 10 is mounted on a movable cart 12, including wheels 14, for permitting the console to be placed at any desired location.

The demonstration console 10 includes a hydraulic system 20 in which the problematic system variables can be controlled and measured. The hydraulic system 20 includes a reservoir 22 for retaining hydraulic oil. In order to permit viewing, the reservoir 22 is preferably made of a clear material, preferably a polymer plastic. An inlet 24 is extended into the reservoir 22 for drawing hydraulic oil into the system 20. A hydraulic fluid strainer 26, preferably having a 60 mesh screen, is placed in the system 20 upstream the inlet 24. The filter 26 includes a clear bowl to demonstrate the function of filtering contaminants from the hydraulic system 20.

A valve 30 is provided on the inlet line for introducing air into the system 20, so as to create controlled aeration. A restricting valve 32 is provided on the inlet line for limiting the flow of oil, which creates cavitation in the system 20 when oil is drawn through the restricting valve 32. A hydraulic pump 34 is provided for drawing oil from the inlet 24 and through the valves 30, 32. The hydraulic pump 34, preferably 3 pgm, includes a clear plastic cover 38 for permitting the observation of the effects of cavitation and aeration inside the pump 34, which degrade pump performance. In the preferred embodiment, the pump 34 is a vane pump, but other pump types can be used without departing from the invention. A flow meter 36 is provided to observe the air in the hydraulic system 20 and demonstrate the reduction in pump efficiency caused by aeration.

The system variables can be monitored to demonstrate reduction in flow and pressure with aeration and cavitation. A vacuum gauge 42 is connected to the inlet line between the restricting valve 32 and the pump 34 to monitor the inlet vacuum and thus the degree of cavitation. A pressure gauge 40 is provided for measuring hydraulic pressure at the pump outlet. The pressure gauge 40 demonstrates the difference in pressure between aerated and non-aerated hydraulic systems. A relief valve 44, preferably 160 psi, is provided downstream of the pump to simulate a load on the system, and thus create a back pressure on the pump 34, in order to observe the effects of aeration and cavitation on a system carrying a load.

Air can be introduced into hydraulic systems through the reservoir, and the present invention illustrates the sources and solutions of such aeration. A pair of two-position directional valves 50, 52 are provided to direct the fluid return lines. When the first valve 50 is closed, fluid returns down a first return line 54 that terminates well below the fluid level of the reservoir 22. In this way, fluid is returned with a minimum of agitation, and very few air bubbles are created in the fluid. However, fluid levels vary so this method is unreliable. If the first valve 50 is open and the second valve 52 is closed, the fluid returns down a second return line 56, which terminates above the liquid level. This type of return agitates the oil, creating many air bubbles. If both the first valve 50 and the second valve 52 are open, the fluid returns through a third return line 58 which terminates in a diffuser 60, which diffuses the oil so as to create minimal agitation in the oil. In this way, the return lines demonstrate the effects of return line termination in creating sources of aeration. The clear reservoir 22 also includes a baffle 62 and a wire mesh screen 64, preferably 60 mesh, for demonstrating the effectiveness of these items at removing air from the reservoir 22 before it reaches the inlet 24.

As described hereinabove, the present invention provides a useful demonstration device. However, it will be appreciated that various changes in the details, materials and arrangements of parts which have been herein described and illustrated in order to explain the nature of the invention may be made by those skilled in the art within the principle and scope of the invention as expressed in the appended claims.

We claim:

1. A hydraulic demonstration apparatus comprising:
   a hydraulic system including a reservoir, an inlet line and an outlet line;
   an air valve at the inlet line for introducing air so as to create aeration in the hydraulic system;
   a restricting valve at the inlet line for creating cavitation in the hydraulic system;
   a hydraulic pump having a clear cover for observing the effects of aeration and cavitation inside the pump; and
   a flow meter having a clear housing, for observing the air in the system and the reduction of pump efficiency caused by aeration.

2. The hydraulic demonstration apparatus of claim 1 further comprising a vacuum gauge connected to the inlet line for monitoring inlet vacuum.

3. The hydraulic demonstration apparatus of claim 1 further comprising a pressure gauge for measuring hydraulic pressure at the pump outlet.

4. The hydraulic demonstration apparatus of claim 1 further comprising a relief valve for loading the system to create pressure.

5. The hydraulic demonstration apparatus of claim 1 further comprising a hydraulic fluid filter with a clear bowl to demonstrate the function of the filter in the hydraulic system.

6. The hydraulic demonstration apparatus of claim 1 further comprising three return lines to the reservoir, wherein a first return line has a diffuser, a second return line has no diffuser and a third return line terminates above the fluid level in the reservoir, wherein the respective return lines are selectively opened to demonstrate the effects of return line termination as sources of reservoir aeration.

7. The hydraulic demonstration apparatus of claim 1 wherein the reservoir is clear and includes a baffle and a wire mesh screen to illustrate the removal of air from the hydraulic system before it reaches the pump inlet.

8. The hydraulic demonstration apparatus of claim 1 wherein the hydraulic pump is a vane pump.

9. The hydraulic demonstration apparatus of claim 1 wherein the apparatus is mounted on a movable cart.

* * * * *